(12) United States Patent
Manning

(10) Patent No.: US 6,967,722 B2
(45) Date of Patent: *Nov. 22, 2005

(54) TILT-COMPENSATED INTERFEROMETERS

(76) Inventor: Christopher J. Manning, P.O. Box 265, Troy, ID (US) 83871

( * ) Notice: Subject to any disclaimer, the term of this patent is extended or adjusted under 35 U.S.C. 154(b) by 0 days.

This patent is subject to a terminal disclaimer.

(21) Appl. No.: 10/277,439

(22) Filed: Oct. 21, 2002

(65) Prior Publication Data

US 2003/0048441 A1 Mar. 13, 2003

Related U.S. Application Data

(63) Continuation of application No. 09/299,022, filed on Apr. 26, 1999, now Pat. No. 6,469,790, which is a continuation-in-part of application No. 08/959,030, filed on Oct. 28, 1997, now Pat. No. 5,898,495.
(60) Provisional application No. 60/120,736, filed on Feb. 18, 1999.

(51) Int. Cl.[7] .................................................. G01B 9/02
(52) U.S. Cl. ...................................................... 356/452
(58) Field of Search ................................. 356/451, 452, 356/455

(56) References Cited

U.S. PATENT DOCUMENTS

| | | | | |
|---|---|---|---|---|
| 4,383,762 A | * | 5/1983 | Burkert | ...................... 356/455 |
| 5,309,217 A | * | 5/1994 | Simon et al. | ................ 356/455 |
| 6,504,613 B1 | * | 1/2003 | Akikuni et al. | ............. 356/452 |

OTHER PUBLICATIONS

W. H. Steel, *Interferometry*, p. 228, pub. by the Sydics of the Cambridge Univ Press.

D.E. Jennings, Passive Tilt Compensation in an FTS using a double–sided flat retroreflector, Applied Optics, vol. 27, p. 4605, Nov. 15, 1988.

* cited by examiner

*Primary Examiner*—Andrew H. Lee

(57) ABSTRACT

The tilt-compensated interferometers of the present invention are novel variations of Michelson's interferometer that use tilt- and shear-compensation to provide excellent photometric accuracy even when there are imperfections in the scanning motion used to produce variation of path difference. The tilt-compensation mechanism of the present invention consists of antiparallel reflections from a beamsplitter element and a roof reflector element, which elements are held rigidly in alignment. Several particularly useful embodiments of the invention are described. Other advantages of the present invention include photometric stability and reduced cost because manual alignment is not required. This interferometer has applications in spectrometry, spectral imaging and metrology.

18 Claims, 9 Drawing Sheets

TILT-COMPENSATED INTERFEROMETERS

CROSS REFERENCE TO RELATED APPLICATIONS

This is a CONTINUATION of prior application Ser. No. 09/299,022, filed on Apr. 26, 1999, entitled TILT-COMPENSATED INTERFEROMETERS, which will issue as on Oct. 22, 2002 as U.S. Pat. No. 6,469,790. The application Ser. No. 09/299,022 claimed priority under 35 U.S.C. § 119(e) from Provisional Patent Application No. 60/120,736, filed Feb. 18, 1999. The application Ser. No. 09/299,022 was a continuation of application Ser. No. 08/959,030, filed Oct. 28, 1997, which issued as U.S. Pat. No. 5,898,495. The application Ser. No. 09/299,022 and 60/120,736 and 08/959,030 applications and U.S. Pat. Nos. 5,898,495 and 6,469,790 are hereby incorporated herein by reference for the entirety of their disclosures.

BACKGROUND OF THE INVENTION

1. Field of the Invention

It is an object of the present invention to provide new interferometers, which are better than prior art in respect to stability, scan speed and cost of manufacture. It is an object of the present inventions to improve the state-of-the-art in photometric accuracy of interferometric measurements.

2. Background Information

The book by Griffiths and deHaseth, "Fourier Transform Infrared Spectrometry," ISBN 0-471-09902-3, is included by reference for the entirety of its content. This book describes much of the prior art and practice in great detail.

Michelson interferometers can be used for many purposes, including spectrometry and metrology. The principle of operation is that a beam of electromagnetic radiation or energy is divided into two portions, which propagate in first and second paths; the two portions are delayed and recombined, leading to interference that is a function of the path difference between the first and second paths, as well as frequency content of the radiation. This prior art is illustrated by FIG. 1. A source of radiation is indicated by 10 and the radiation may be collimated by a parabolic mirror 11 into a primary beam of energy. The primary beam is divided at the beamsplitter 30 into two portions, which propagate in first 15 and second 16 paths. These paths 15 and 16 are often called the arms of the interferometer, and are typically oriented at 90 degrees to each other, as shown in FIG. 1.

At the ends of the two arms or paths 15 and 16 are mirrors 80A and 80B from which the two beams are reflected back toward the beamsplitter, retracing more or less exactly paths 15 and 16. At the beamsplitter, each of the two returning beams are split again resulting in two recombined beams. One recombined beam propagates back toward the source, generally being lost from use, and the second (hereafter, "the recombined beam") propagates out of the interferometer at an angle to the input beam, and follows a path to a detector. The second recombined beam may propagate to a parabolic focusing mirror 21A that concentrates the radiation at a sampling point 23. The radiation from the sampling point may be collected by a mirror 21B and focused on a detector 20. Many alternatives to the mirror combination 21A and 21B are known in the art. Radiation from a second source 12, generally having a precisely known wavelength, may be used as an internal standard of distance for the interferometer. Such a source 12 is often a helium-neon laser, but may be instead a diode laser, stabilized diode laser or gas discharge lamp. The radiation from the second source may be observed simultaneously with a second detector 21. External focusing optics generally are not required for a reference laser such as 12 because the beam is already tightly collimated. The interferometer usually is operated by moving one of the mirrors; the most common method for driving the mirror is a voice coil linear motor, but many other approaches are possible and some are known. The mirror may be moved at constant velocity and reciprocated, or it may be moved incrementally and stopped. It is understood that the signals from the detectors 12 and 22 are generally digitized and input to a computer. The data are processed by known means to generate and display spectra of the source radiation as modified by interaction with a sample.

A disadvantage of the Michelson interferometer and many related designs is that the two end mirrors 80A and 80B are susceptible to misalignment with each other and with the beamsplitter 30. Further, the alignment must be preserved, to interferometric tolerances, during and between motion of one or both of the mirrors 80A and 80B. Expensive, high-quality bearings are often required to provide such precise rectilinear motion. In some instruments, airbearings are used with the aforementioned voice coil linear motors to provide such motion. Various other solutions to this problem have been proposed in the literature and prior art. For example, Jamin (1856), Solomon (U.S. Pat. No. 5,675,412), Turner and Mould (U.S. Pat. No. 5,808,739), Spanner (U.S. Pat. No. 6,369,951), Frosch (U.S. Pat. No. 4,278,351), Woodruff (U.S. Pat. No. 4,391,525), and related designs provide interferometers in which slight misalignments of the optical components are compensated with respect to interferometric alignment. Slight residual misalignment may result in a beam of radiation not reaching exactly the intended detection location. The sensitivity to the resulting misalignment of the source image on the detector is roughly 100 times smaller than the sensitivity to interferometric misalignment. In short, there is a substantial advantage to optical tilt compensation. However, a disadvantage of the prior art is the long optical paths required for optical tilt compensation. For example, the approaches of Frosch, Woodruff, Solomon, Turner, and others, impose an undesirable limit on throughput, which is the product of solid angle and aperture area.

Larsson has described in U.S. Pat. No. 5,650,848 a method for tilt-compensating the scanning mirrors of an interferometer. This prior art extends ideas described by Steel in the 1960's (see for example, "Interferometry," Cambridge University Press, 1967 W. H. Steel). Larsson's approach employs three mutually perpendicular facets on a common assembly, but the radiation reaches them in a substantially different order than in the present invention. The radiation first reaches a beamsplitter. After being divided into two beams, in Larsson's interferometer design, each of the two beams reaches a single reflector surface rigidly and perpendicularly mounted to the beamsplitter. Because the single reflectors are mutually perpendicular, the two beams from the beamsplitter are both folded by 90 degrees (in different planes), rendering them antiparallel. Two plane mirrors held in opposition on a common carriage may be used to return the beams to the beamsplitter. One substantial improvement, relative to Larsson, of the present invention described herein, is that two reflector facets are placed in one arm of an interferometer. Further, the facets are combined into a roof reflector, which makes the assembly of the present invention more compact, more rigid and provides a rigid mounting surface for the beamsplitter and associated components.

Bleier et al. describe what they term "monolithic optical assemblies" in two U.S. patent, U.S. Pat. No. 5,949,543 (1999), and U.S. Pat. No. 6,141,101 (2000). Their system might also be called a bilithic interferometer, in that two assemblies are juxtapositioned to form a variation of Michelson's design. The two assemblies are a hollow cube corner retroreflector and the monolithic assembly containing a beamsplitter and two reflecting surfaces. The two reflecting surfaces are interferometer end mirrors analogous to mirrors 80A and 80B of FIG. 1. Bleier's two reflecting surfaces, like 80A and 80B of FIG. 1, are mutually perpendicular with each other, but not with the beamsplitter; they are oriented at 45 degree angles relative to the beamsplitter. Hence, Bleier's monolithic interferometer is not tilt-compensated to the full extent of the present invention. However, the construction techniques taught by Bleier for producing monolithic assemblies can be applied to the interferometer designs of the present invention. This is not presently the preferred approach to construction, because the resulting assemblies are more fragile and thought to be more expensive than the construction of the preferred embodiments described below.

SUMMARY OF THE INVENTION

The present invention described herein substantially increases throughput relative to prior art tilt-compensated interferometers, while enabling very compact designs. Tilt compensation can improve photometric accuracy and also improve very rapid scan operation of a reciprocating mirror interferometer. The present invention provides a related series of novel tilt-compensated interferometer designs comprised of a beamsplitter rigidly mounted to a roof reflector, combined with various other optical components. By "roof reflector", what is meant is a pair of abutted mirror facets that are perpendicular to interferometric tolerances, as is known in various optical arts. The present invention is illustrated with several embodiments in which the advantages are employed to achieve a series of related ends. Interferometric alignment means an accuracy on the order of the wavelength of the radiation being used in the interferometer. In the context of angles, interferometric alignment means that the displacement of a beam by angular deviation is on the order or less than a wavelength of electromagnetic radiation over the length of travel. Angles this small are generally about 1 arcsecond or a few microradians.

DETAILED DESCRIPTION OF THE INVENTION

The operation of the various interferometer embodiments of the invention described below is analogous to the operation of the prior art Michelson interferometer. The same external components such as source, laser, detector and laser detector may be used with the designs described below to achieve ends that are either known or as-yet undiscovered. Electronics and computers are preferably used to process the data according to known means. Many of the known methods of operation are detailed in Griffiths and deHaseths' book, cited above.

Figure 2:
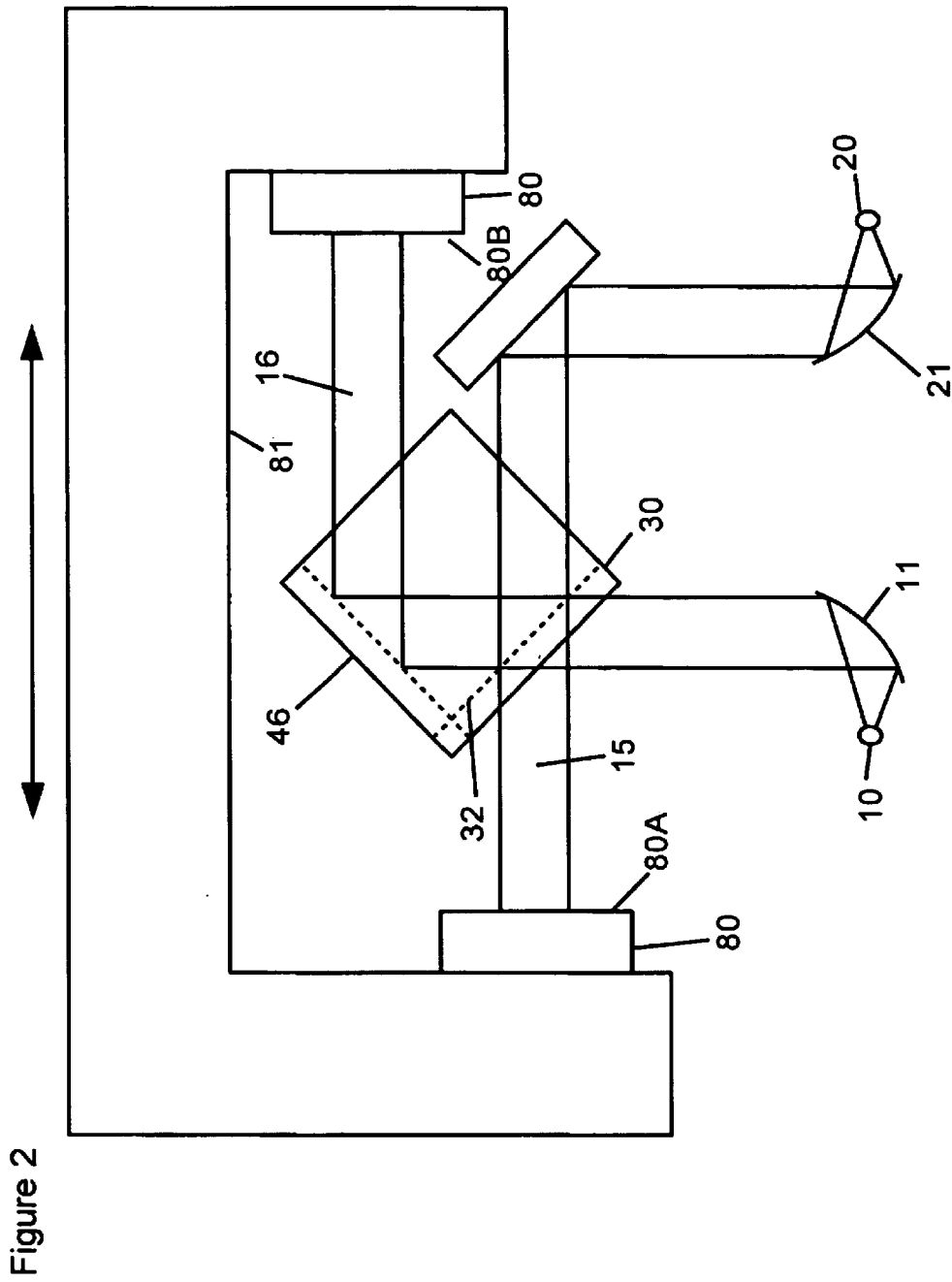
FIG. 2 shows a diagram of a first interferometer embodiment.

FIG. 2 shows a plan view of a permanently aligned interferometer for which errors of the motion of the scanning assembly 81 are compensated. The assembly 81 may be supported by a variety of mechanisms including ball bearing slides, roller bearings, flex pivots, or airbearings to provide smooth, essentially rectilinear motion. The beamsplitter is indicated by 30 and roof reflector/beamsplitter mounting monolith is indicated by 46. Two mirrors that form the terminal ends of the interferometer are indicated by 80A and 80B. These mirrors are rigidly affixed to the moving assembly 81 in direct opposition. The parallelism of their faces 80A and 80B is preferably good to interferometric tolerances. In the preferred embodiment, these mirrors may be manufactured on aluminum substrates using single-point diamond turning, then glued to the moving assembly with a highly-filled epoxy such as Epotek H77 (Billerica, Mass.). If the moving assembly also is fabricated from aluminum, which is a light and stiff metal, then the coefficient of expansion of the mirror, the epoxy and the moving assembly will be closely matched. Alternatively, the mirrors may be formed as an integral component of the scanning carriage. Consequently, changes in the temperature of the system will generate only minimal distortions of the alignment. A mirror 40 may be used to fold the second recombined beam out of the interferometer to the detector focusing mirror 21. This mirror is optional and the detector focusing mirror 21 may be located in the same place as mirror 40, or at another location. The angle of the folding mirror 40 is not critical, so long as the beam accurately reaches the detector 20.

The primary beam of radiation is split at the beamsplitter coating 32. A reflected portion enters the first optical path 15 where it propagates to a first reflector 80A. The incidence of the first energy beam on the reflector 80A is substantially perpendicular to the surface. Thus, to interferometric tolerances the radiation beam reflected from the mirror 80A to become the first returning beam exactly retraces the path 15 taken from the beamsplitter coating 32. When the first returning beam reaches the beamsplitter coating 32, a portion is transmitted to become part of the recombined beam ultimately reaching the detector 20.

A transmitted portion of the primary radiation beam enters the second optical path 16. It interacts with the facets 47 and 48 of the roof reflector (detailed in FIG. 5B). The beam is inverted about a horizontal plane and turned 90 degrees by the roof reflector 46. The beam continues in the second optical path 16 to the second reflector 80B.

A second returning beam is generated by the reflection from the second reflector 80B. The second returning beam proceeds along the second optical path 16 in the opposite direction it took from the beamsplitter coating 32. It reaches the roof reflector facets 47, 48 where it is again inverted about a horizontal plane. The second returning beam then propagates to the beamsplitter coating 32 where a portion of the energy is reflected into the path of the recombined beam. It mixes with the energy in the first returning beam that was transmitted by the beamsplitter coating 32. The recombined beam propagates via mirrors 40 and 21 to the detector 20.

Figure 3A:
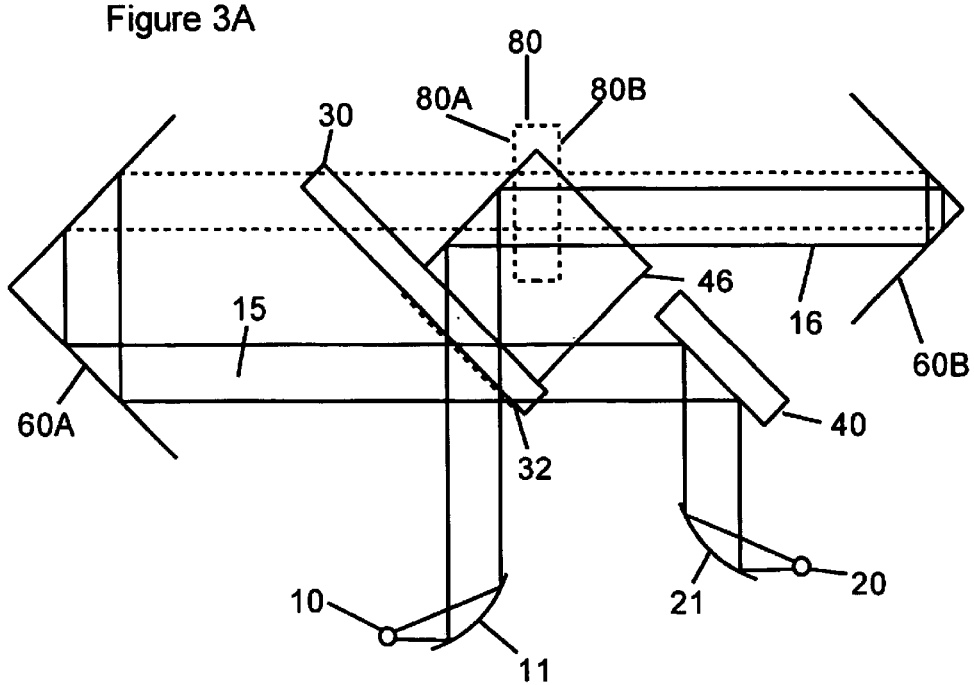
FIG. 3A shows a diagram of second interferometer embodiment.
Figure 3B:
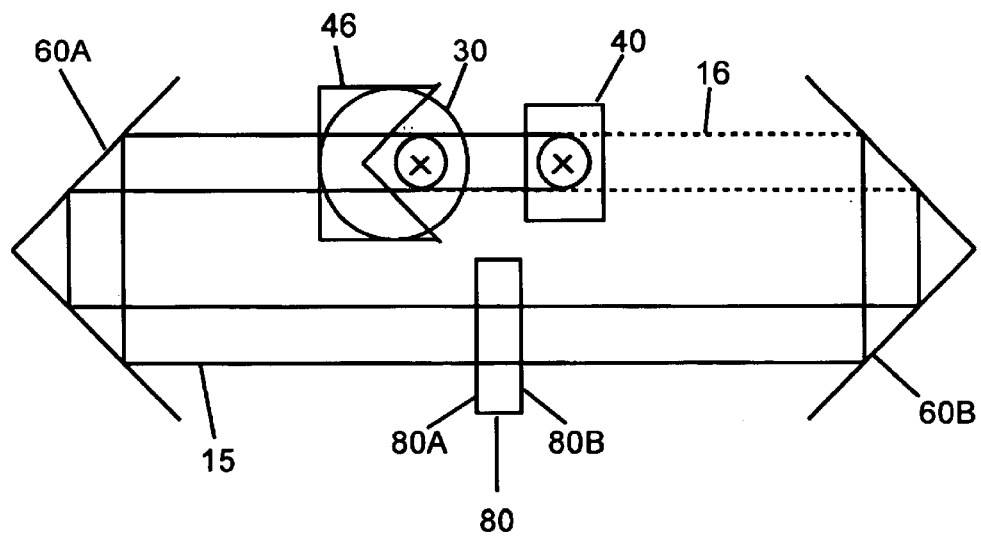
FIG. 3B shows a diagram of second interferometer embodiment.
Figure 4:
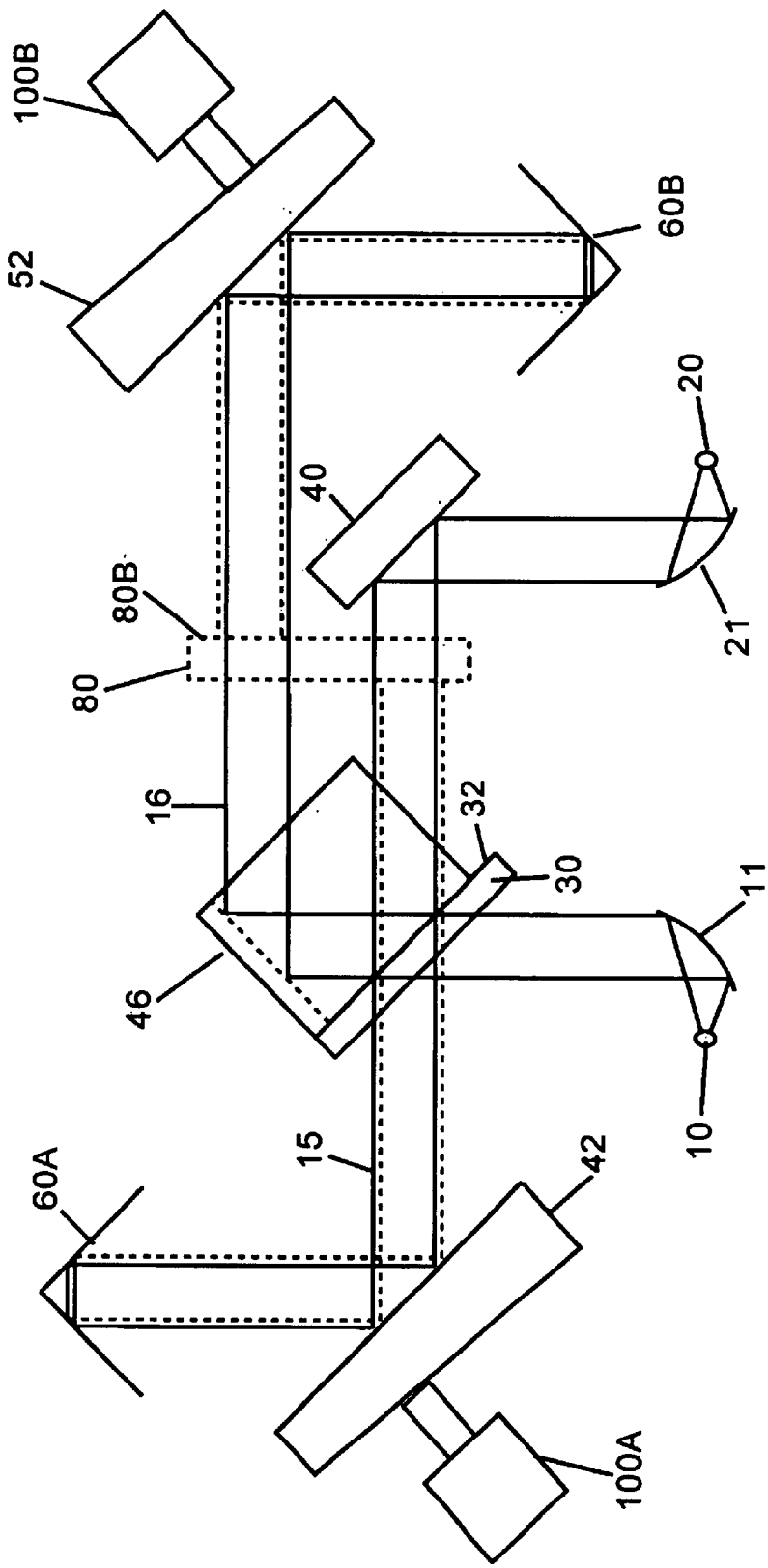
FIG. 4 shows a diagram of third interferometer embodiment.

The operation of the other embodiments described relative to FIGS. 3A, 3B, and 4 are essentially the same, with the exception that additional reflectors are interposed in the first and second paths. Any number of such reflections may be interposed in the first and second paths, so long as the tilt and shear of the first and second energy beams are not disturbed. The use of such additional reflecting surfaces is one thrust described by U.S. patent application Ser. No. 09/299,030 by Manning (U.S. Pat. No. 5,898,495).

The advantages of the interferometer illustrated in FIG. 2 are manifold. First, it is a tilt-compensated design providing improved photometric accuracy. Second, the throughput is very high relative to prior art tilt-compensated interferometers. Third, this design is relatively inexpensive to manufacture. Fourth, this interferometer provides compensation for imperfections of scan motion. Fifth, this design is particularly compact. Sixth, this design provides a large change in path difference for each unit of motion of the scanning carriage 81.

FIG. 3A and FIG. 3B illustrate another embodiment of the invention in which the antiparallel beams reflected from the beamsplitter 30, coating 32 and roof reflector 46 are both folded by 180 degrees to reach opposite sides 80A and 80B of the same mirror 80. The two faces 80A, 80B of mirror 80 are preferably parallel to interferometric tolerances. Methods for producing such mirrors are known in the art. If the mirror 80 is made of a lightweight material such as beryllium, it may be reciprocated very rapidly to effect scanning. Path difference scanning also may be provided by scanning either or both of the cube corner retroreflectors 60A and 60B in a manner well known in the prior art. The cube corner retroreflectors may be replaced by cat's eye retroreflectors. Either type may be used interchangeably. Any inadvertent motions, particularly tilt and shear, of the elements 60A, 60B, or 80 do not compromise the interferometric alignment. Any inadvertent tilting of the mirror 80 affects equally the angle of the beams in the first and second paths of the interferometer, thus providing optical cancellation of the effect of tilt on interferometric alignment. As before, the primary beam of energy from source 10 and collimating mirror 11 is split at element 30 by coating 32. It should be noted that this diagram shows a different beamsplitter configuration, akin to those described in U.S. patent application Ser. No. 09/299,030. The beamsplitter geometries are essentially interchangeable, and for different applications one may be preferred over another.

The beamsplitter/compensator/mounting system described below relative to FIG. 5 may be used in place of the ones described relative to FIGS. 2, 3A and 3B, and 4. The two antiparallel beams reach roof reflectors 60A and 60B where they are inverted and folded by 180 degrees. By positioning the cube corner retroreflectors 60A and 60B appropriately, the beams also are sheared downward to clear the beamsplitter/roof reflector assembly 30 and 46. The three-dimensional nature of the system is shown clearly by the side view of FIG. 3B. The dotted lines indicate that a beam is in a different plane relative to the paper. For clarity, the view of FIG. 3B omits source 10, source collimating mirror 11, detector focusing mirror 21 and detector 20. The beamsplitter 30 shown in this FIG. 2 has no compensator, to demonstrate that a variety of beamsplitter geometries are acceptable as long as the angle between the roof reflector facets and beamsplitter coating is accurately maintained perpendicular.

The advantages of this embodiment are also manifold. The throughput advantage described relative to FIG. 2 is generally preserved. The main advantage of this design is that the light weight of mirror 80 allows very rapid-scan operation, while preserving optical tilt compensation for the moving element. A further advantage of this design is that it is compact. Yet another advantage of this design is that it provides a large change in optical path difference for each unit of motion of elements 60A, 60B and 80.

Jennings has reported a related design (D. E. Jennings, Applied Optics Vol. 27, page 4605) that shares the potential advantage of very-rapid-scan operation, but does not provide the full degree of tilt-compensation that is possible with the present invention described herein.

The embodiment illustrated in FIG. 4 combines the very-rapid-scan capability provided by the tilt-compensation techniques and disk mirrors described in U.S. Pat. No. 5,898,495 to Manning with the advantages of a tilt-compensating beamsplitter/roof reflector assembly 30 and 46. The embodiment shown in FIG. 4 is a variation of the design illustrated in FIGS. 3A and 3B, modified by the insertion of disk mirrors 42 and 52 into the first and second paths. These paths are folded by the cube corner reflectors 60A and 60B to make tilt-compensating complementary reflections from the disk mirrors 42 and 52. The tilt-compensation of the reflections from disk mirrors (and other plane mirrors) is the essence of U.S. Pat. No. 5,898,495 to Manning. It should be understood that optical path difference scanning can be achieved with only one disk mirror; therefore the second disk mirror is optional. The second disk mirror may be replaced by a flat mirror to maintain the folded geometry without the expense of a motor and disk mirror. The addition of a second disk mirror and motor into the system creates the possibilities described in U.S. patent application Ser. No. 09/299,030 (U.S. Pat. No. 5,898,495) for operating the disk mirrors with different angular velocities and different phase relationships.

Figure 1:
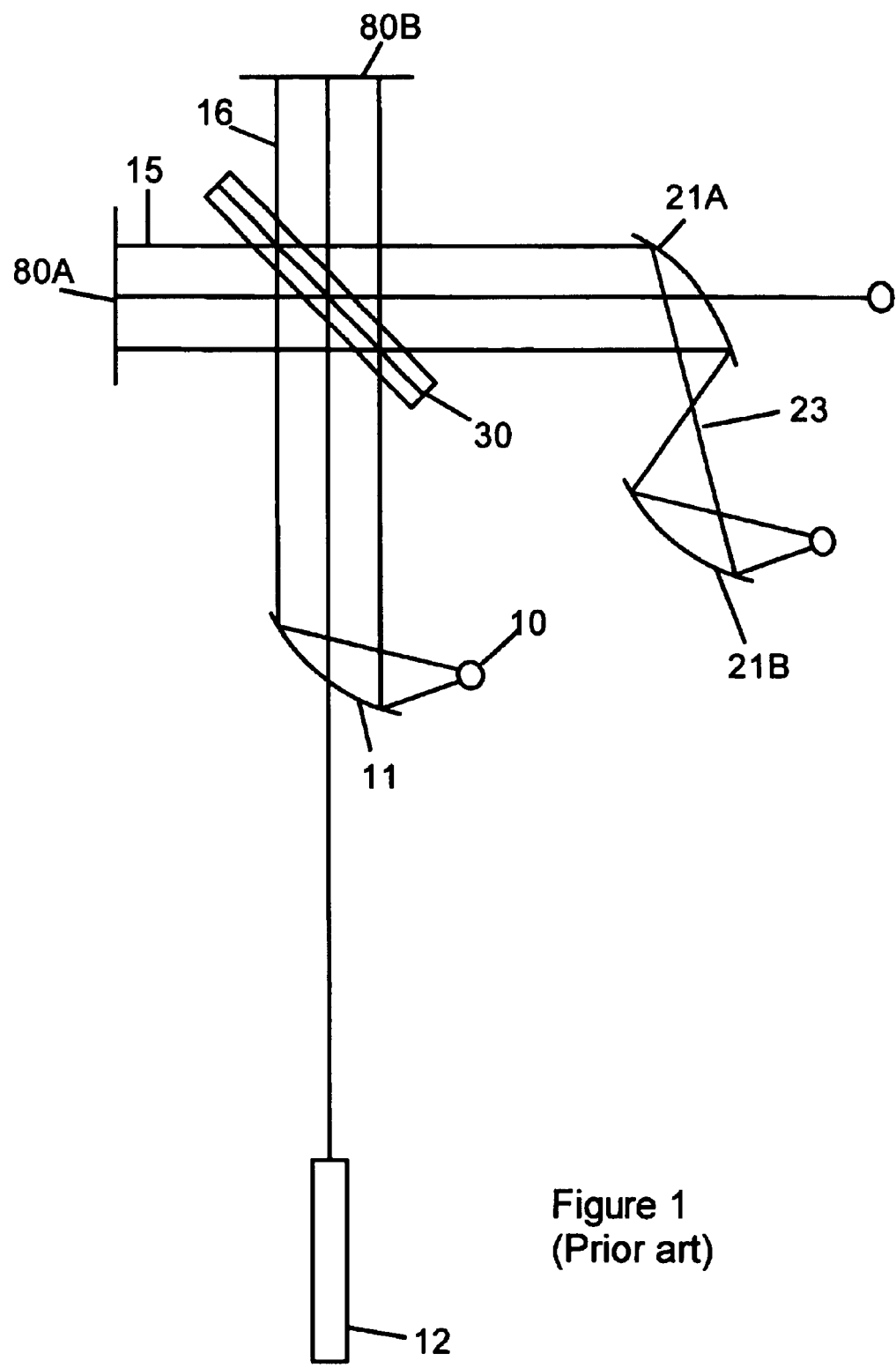
FIG. 1 shows a diagram of a prior art Michelson interferometer.

The preferred motors 100A and 100B for this type of operation are brushless DC motors. Encoders may be used to track the phase of such motors very accurately. The motors may employ steel ball bearings, ceramic ball bearings, magnetic levitation or air bearing support for the armature. Such motors are controlled routinely for industrial applications using known art. It is generally preferred that the current in the brushless motor be controlled with a linear amplifier so that electromagnetic interference with the detectors 20 and 22 (e.g., FIG. 1) is minimized. This type of interferometer, when operated at speeds above about 100 scans per second, is best operated in a rigid vacuum housing for several reasons. First, the disk mirrors store substantial kinetic energy that can be inadvertently released, e.g. by fracture. A vacuum housing is generally strong enough to contain the disk or fragments. Second, the airflow around the disks can be quite loud; in vacuo, the operation is nearly silent. Third, it is possible that turbulence of the air on the disk surface creates fluctuations in the path differences experienced by different portions of the beams. The technology for vacuum interferometers is well known in the art. The operation of the interferometer of the present invention as shown in FIG. 4 follows the discussion relative to FIG. 3A and FIG. 3B, with the variation that a reflection from the disk mirrors 42 and 52 occurs both before and after reflection in the two retroreflectors 60A and 60B.

Figure 5A:
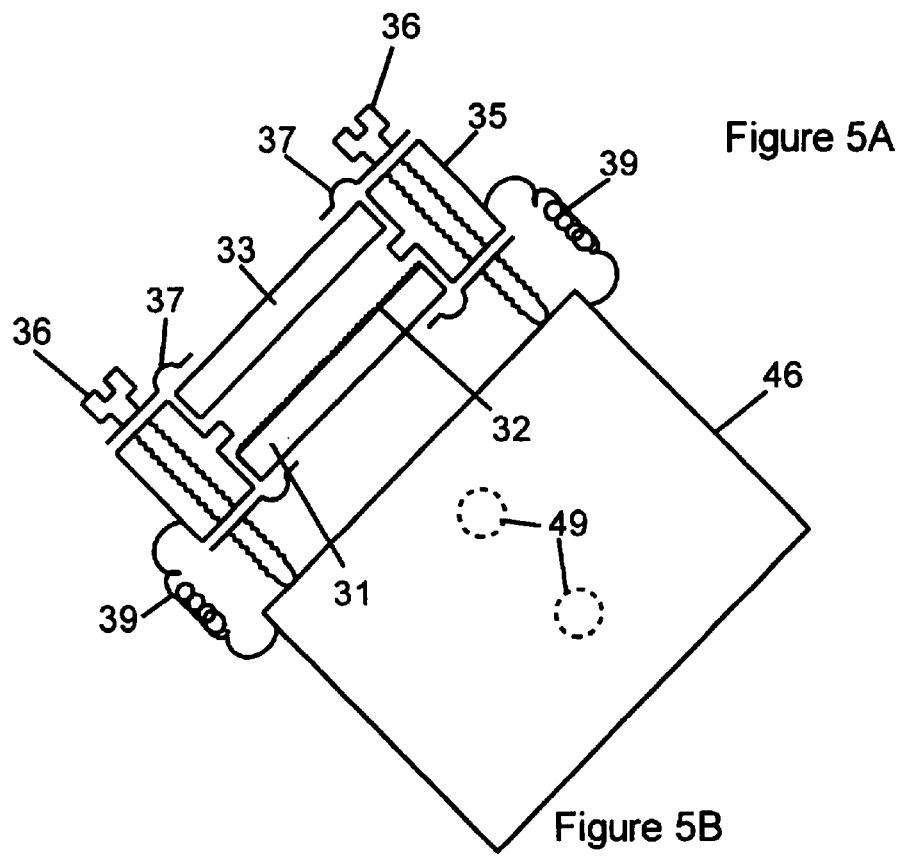
FIG. 5A shows a diagram of a beamsplitter/roof reflector assembly.
Figure 5B:
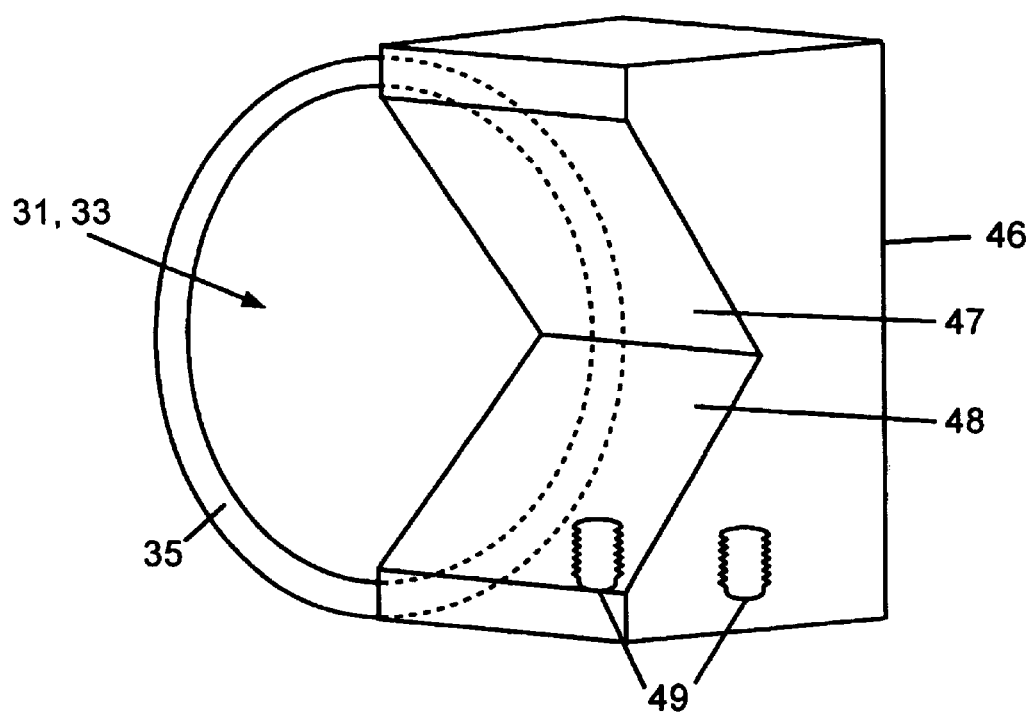
FIG. 5B shows a diagram of a beamsplitter/roof reflector assembly.

FIG. 5A and FIG. 5B show two views of a beamsplitter/ roof reflector assembly; FIG. 5A is a section view through the assembly and 5B is a perspective. The beamsplitter is held such that it is mutually perpendicular with two facets 47, 48 of a roof reflector 46, which are themselves perpendicular. The key result of this arrangement is that a beam impinging on the beamsplitter 30 will be divided by the coating 32 into two beams that are made exactly antiparallel. Any motion of the assembly 32 and 46 with respect to the incident beam will be imposed exactly equally on the two antiparallel beams, thus maintaining them exactly antiparallel. The beams are antiparallel because the matrix transform for the reflection from a single plane (the beamsplitter coating 32) is the opposite of the matrix transform for the double reflection from the roof reflector facets 47 and 48.

FIG. 5A shows the detail of the beamsplitter mounting on the roof reflector substrate or monolith 46. There are a variety of approaches that might be taken to hold a beamsplitter substrate 31 in alignment with the facets 47 and 48 of the roof reflector 46. The illustrated embodiment is preferred because it allows precise adjustment of the angle between the beamsplitter substrate 31 (and consequently coating 32) and the roof reflector facets 47 and 48, as well as providing a secure mounting for the optional compensator plate 33. The plates 31 and 33 may be held by a sheet metal spring 37 against a lip 38 that is an integral component of the ring 35. The ring 35 may be machined from aluminum alloy. The ring 35 is drilled and tapped such that screws 36 may push against the monolith 46 providing adjustment of the angle between the ring 35 and the facets 47, 48. The ring 35 is restrained to the monolith by springs 39. FIG. 5B shows a perspective view of the assembly looking into the aperture of the hollow cube retroreflector that is formed by the two facets 47 and 48 of the roof reflector and the facet comprised of the reflective coating 32 of the beamsplitter. Tapped holes 49 may be provided in the bottom of the monolith 46 to allow mounting of the assembly to an optical bench. Alternatively, the assembly may be held by adhesive to, or fabricated as part of, a larger system.

Two preferred methods for fabricating the roof reflector monolith are described. These techniques are generally known in the art and also may be applied to the manufacture of other components such as end mirrors. These techniques are electron-discharge machining (EDM), particularly wire EDM, and ceramic molding, either process followed by replication or polishing and metallization. It is thought that by the choice of substrate 46 metals that have very uniform coefficients of expansion, together with the use of wire EDM, that excellent precision substrates can be prepared. Preferred metals are aluminum, invar, and stainless steel. EDM uses electric arcing to erode metal from a part in a dielectric bath. The electric arcing produces very little damage to the part and particularly does not leave residual stresses that can cause adverse thermal distortion. Wire EDM can produce surface finishes that are excellent for replication or subsequent polishing. Replication is a known method for producing high-quality optical surfaces. Another preferred approach for preparation of roof reflector substrates is slip-casting of ceramic mixtures and molding of ceramic pastes or clays. By judicious choice of ceramic composition, the thermal expansion properties of the ceramic can be tailored to be isotropic (i.e., uniform in all directions), and also small. In particular, the addition of ceramic microspheres to the casting composition is preferred because the resulting ceramic bodies will tend to have isotropic properties. Some ceramic compositions have particles that have non-uniform properties. If the particles are shaped such that they align preferentially (e.g., flakes or rods), then the macroscopic properties of the resulting masses may not be isotropic, which can lead to thermal distortion when temperature changes occur. After casting or forming, it is understood that the resulting ceramic pieces are fired, then used as substrates for replication, or polished and metallized.

Figure 6A:
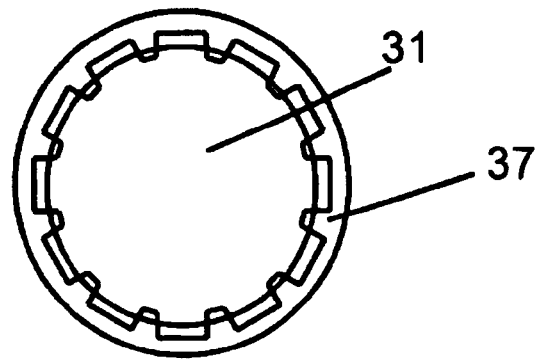
FIG. 6A shows details of the beamsplitter and compensator mounting.
Figure 6B:
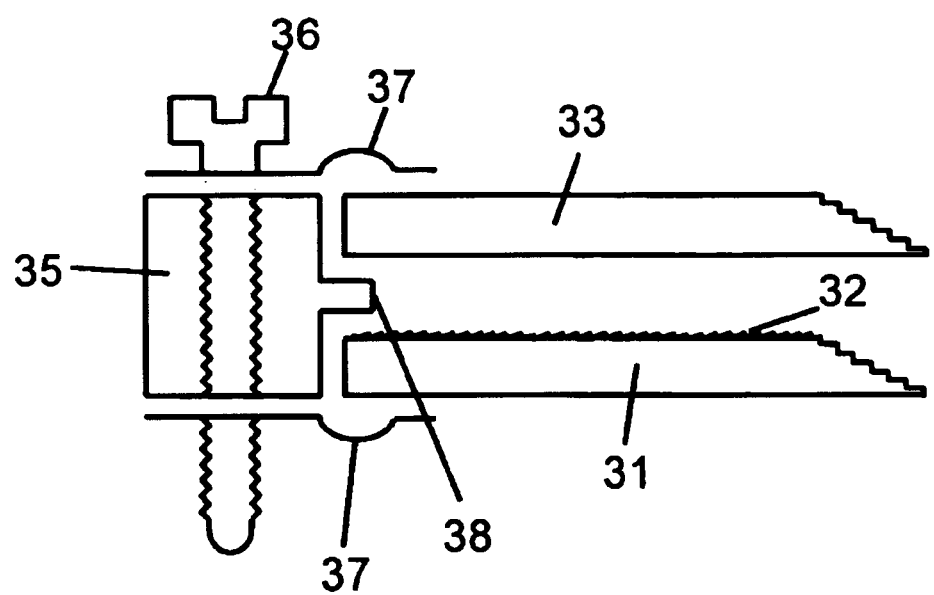
FIG. 6B shows details of the beamsplitter and compensator mounting.

FIGS. 6A and 6B show detail of the beamsplitter mounting hardware introduced relative to FIG. 5A and FIG. 5B. In particular, the spring fingers 37 can be clearly seen in FIG. 6A to be in contact with the beamsplitter substrate 31. The detailed section of ring 35 can be seen in FIG. 5B. The ring 35 is preferably turned on a lathe to produce a lip 38 of known dimensions. By using a computer-numerically-controlled lathe for this operation, the thickness of the lip 38 may be varied around its periphery to provide a wedge angle for the air gap between the beamsplitter substrate 31 and the compensator plate 33. This practice is known in the art, as is the practice of wedging the beamsplitter substrate 31 and compensator plate 33. The spring finger 37 may be manufactured by a variety of known manufacturing methods, including wire EDM, fine blanking, laser cutting and punching. A variety of other methods for mounting beamsplitters are known in the art.

Figure 7A:
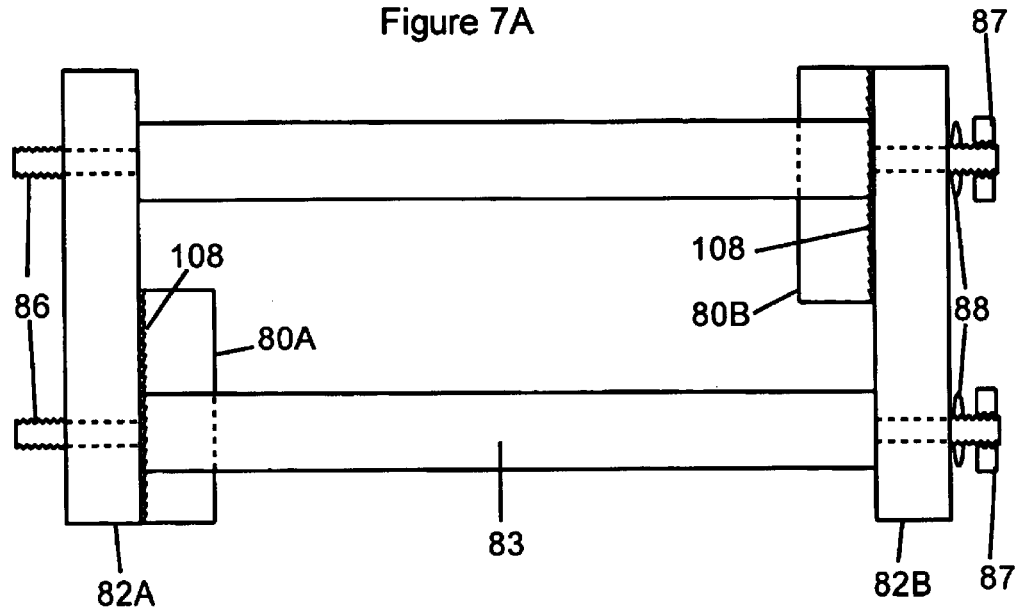
FIG. 7A shows a diagram of a scanning assembly.

FIG. 7 shows details of a preferred scanning carriage 81 introduced in FIG. 2. This embodiment is preferred for prototyping and small production runs where casting is not economical. The scanning carriage may be manufactured as a monolith, for example, by milling a solid block of aluminum alloy. However, this is not the most economical method for constructing such a carriage. By manufacturing the carriage from extruded rods 83, which may be aluminum alloy, and rolled plates 82A and 82B, which may also be aluminum alloy, the cost can be reduced. The parts are preferably stress relieved after machining by heating to 350 F for 4 hours. The methods of assembly must be chosen judiciously to avoid problems with mismatch of thermal expansion coefficients.

The preferred method for assembling this carriage from machined parts employs threads 86 cut in the ends of the rods 83 where they penetrate the plates 82. Spring washers 88 are placed on the threaded ends 86 of the rods 83 and are secured with nuts 87. The nuts 87 and the spring washers 88 may be steel. It is intended that the thermal expansion of the aluminum alloy plates 82A and 82B will match the thermal expansion of the rods 83. Thus, the springs 88 compressed by the nuts 87 will provide essentially constant tension on the plates 82A and 82B, driving them against shoulders cut in the rods, and thereby maintaining constant alignment between the mirror surfaces 80A and 80B. The rods may be secured together by cross-members to provide additional stiffness for the scanning carriage 81. The cross-members can take a variety of forms, including welded struts or sheet metal straps. The three-dimensional nature of the scanning carriage is obscured in the two-dimensional drawing of FIG. 7A. It should be understood that at least a third rod of the type 83 is obscured beneath one of the rods 83 shown in the drawing.

Figure 7B:
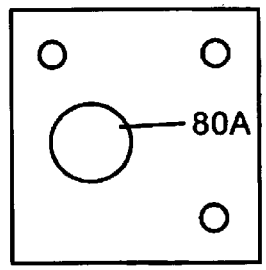
FIG. 7B shows a diagram of some components of a scanning assembly.
Figure 7C:
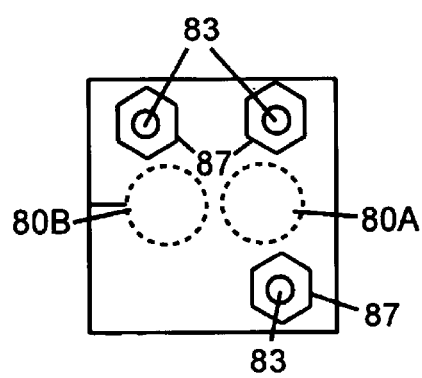
FIG. 7C shows a diagram of some components of a scanning assembly.

FIGS. 7B and 7C show details of the end plates 82A and 82B of the scanning carriage. The mirror facets 80A and 80B are shown in dashed outline in FIG. 7C, which is the back view of one of the plates. The nuts 87 and ends of the rods 83 are shown in this view. The face of the plate 82A is shown in FIG. 7B and the replicated or polished mirror facet area 80A is also shown.

Figure 8:
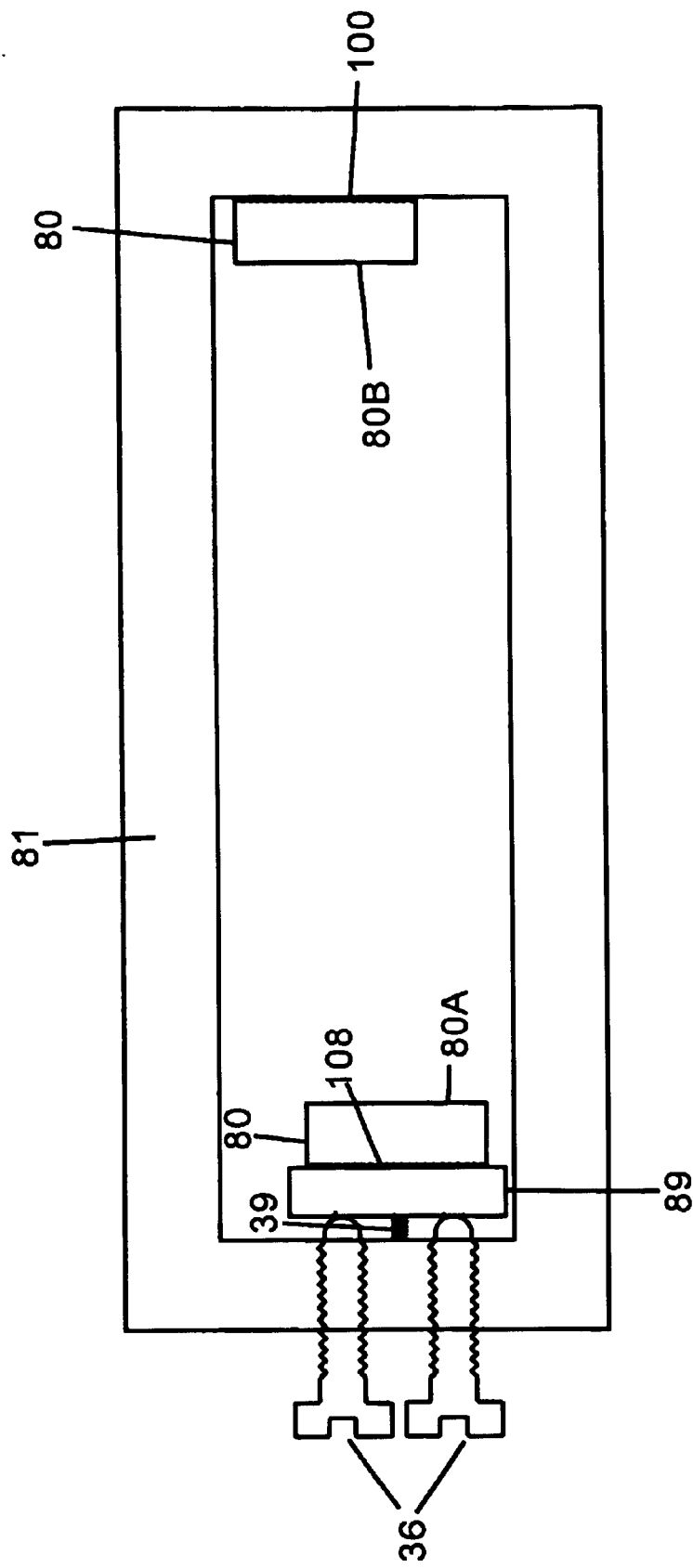
FIG. 8 shows a diagram of alternative scanning assembly.

FIG. 8 shows an alternative embodiment of the scanning carriage in which the mirror 80A is mounted adjustably. The other mirror 80B may be mounted in a fixed manner, preferably using a thermal coefficient of expansion-matched material. It may also be formed as an integral component of the scanning carriage 81. For an aluminum mirror mounted to an aluminum carriage, Epotek H77 epoxy provides a thermal coefficient of expansion (TCE) match within about 6 parts per million per degree C. Springs 39 pull the mirror backing plate 89 against the tips of the adjustment screws 36. The adjustment screws may be of the differential type known in the art. Thus, by turning the screws 36, the tilt of the mirrors may be adjusted very precisely. The usual criterion for this adjustment is maximizing the strength of the detector signals. Alternatively, laser interferometry may be used as feedback for aligning the two mirrors 80A and 80B to precise parallelism. The carriage 81 shown in this diagram is indicated to be of monolithic construction. Such an assembly can be inexpensively manufactured by a variety of approaches; one that is particularly favored is casting of aluminum alloy. For aerospace applications, the favored material for this frame is beryllium alloy or carbon fiber composite. Zerodur mirrors may provide a close match to the thermal expansion coefficient of some carbon fiber composite materials.

Figure 9A:
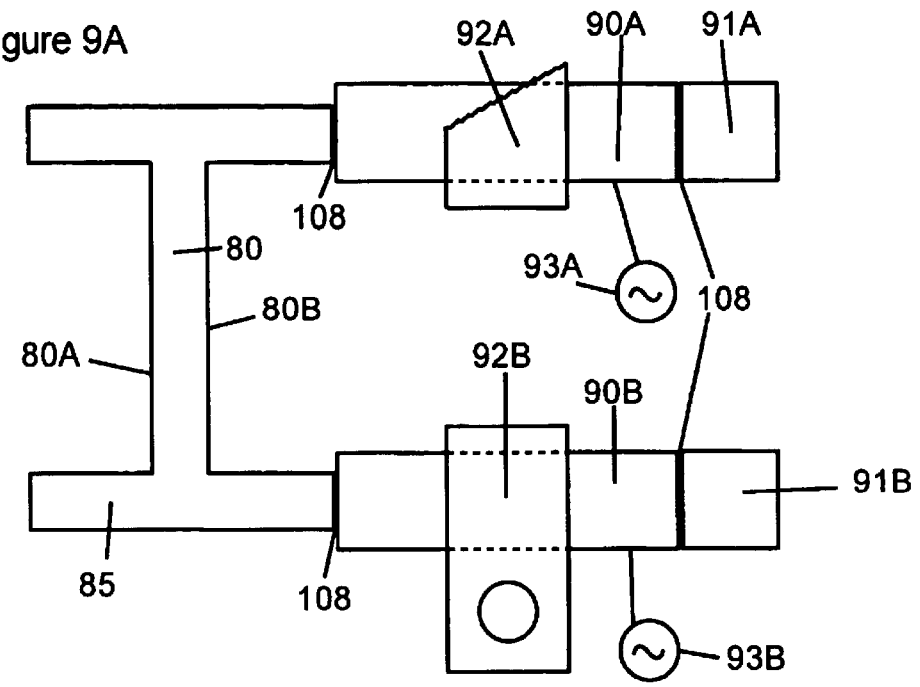
FIG. 9A shows a diagram of a very-rapid-scan drive mechanism.
Figure 9B:
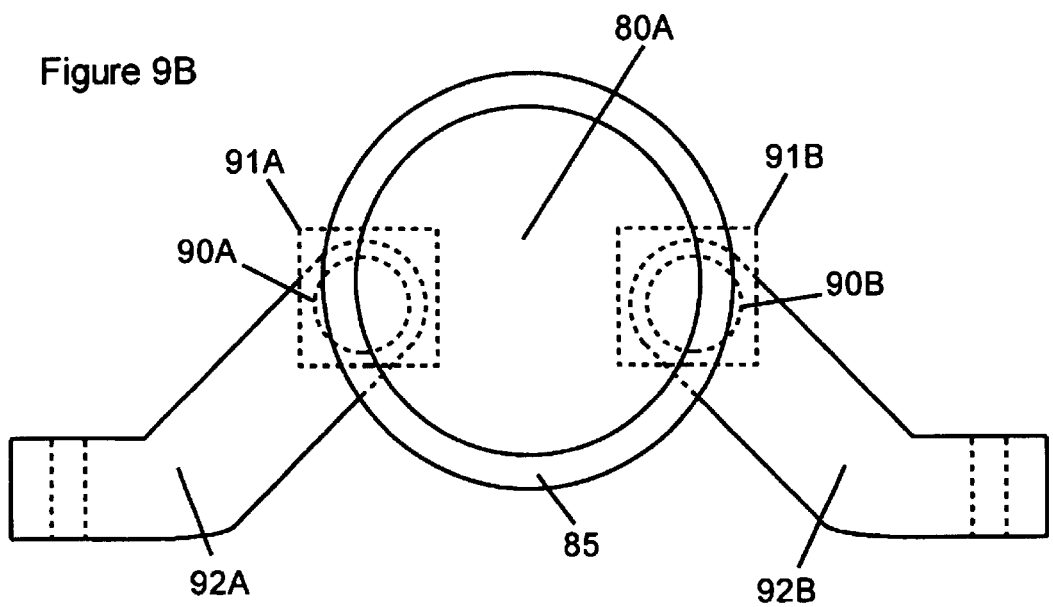
FIG. 9B shows a diagram of a very-rapid-scan drive mechanism.

FIG. 9 illustrates an ultra-rapid-scanning mechanism for driving the double-sided mirror 80 described relative to FIG. 3A and FIG. 3B. In one preferred embodiment, piezoelectric elements 90A and 90B are arranged symmetrically around the mirror 80. FIG. 9 indicates that the transducers 90A and 90B are a pair, which is particularly convenient. The mirror 80 shown in this figure has been stiffened by the addition of a ring 85 around the periphery. This ring helps the mirror resist distortion during the intense acceleration provided by the piezoelectric elements 90A and 90B. The piezoelectric elements may bear against counterweights 91A and 91B that absorb the reaction forces generated by the piezoelements. This prevents the optical bench (not shown) supporting the other optical components, such as 10, 11, 20, 21, 30, 46, 60A and 60B of FIG. 3A, from being vibrated. FIG. 9A shows a top-down view of the scanning mechanism. The mounts 92A and 92B may be a hard rubber composition, or metal with a rubber insert around the piezoelectric transducer body 92A and 92B. The point of contact between the transducer 90A and 90B may be a rubber bushing to allow small motions of the piezoelement caused by imperfect balance between the counter-masses 91A and 91B and the mirror 80 and 85 mass. The piezoelectric elements 90A and 90B may be bonded to the mirror with epoxy 108 and to the counterweights 91A and 91B with epoxy 108. The piezoelectric transducer must be provided with relatively high voltage and alternating current waveforms from power supplies generally indicated by 93A and 93B. These supplies are preferably under the control of a computer, using known technology. FIG. 9B shows an end view of the piezoelectric drive assembly. The hidden lines in mount 92A and 92B indicate holes that may be used to secure it to an optical bench or other assembly for incorporation in an interferometer of the type described relative to FIG. 3A and FIG. 3B. It should be understood that other types of transducers may be substituted for the piezoelectric devices 90A and 90B. For example, magnetostrictive transducers may be more suitable for generating larger forces and displacements in a given volume, but might require cooling. Many other types of transducers can also be substituted. It should be appreciated that the particular advantage of this geometry is that the tilt-compensation relaxes the requirement for strictly rectilinear motion of mirror facets 80A and 80B, allowing for lower precision and therefore lower cost control of the motion at high accelerations.

The principles, embodiments and modes of operation of the present invention have been set forth in the foregoing specification. The embodiments disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously contemplated. Numerous variations and changes can be made to the foregoing illustrative embodiments without departing from the scope and spirit of the present invention.

What is claimed is:

1. A spectrometer comprising:
   a source of a primary beam of radiant energy,
   a beamsplitter for dividing the primary beam into at least a first beam and a second beam, wherein the first beam traverses a first optical path, and the second beam traverses a second optical path,
   at least a first reflector having a first orientation and positioned to receive the first beam along the first optical path and to reflect a first returning beam along the first optical path back through the beamsplitter where the first returning beam traverses a recombined beam optical path,
   a second reflector having a second orientation opposite the first orientation of the first reflector,
   a roof reflector, wherein the second beam following the second optical path is reflected and inverted by the roof reflector and directed along the second optical path to the second reflector, and wherein the second reflector receives and reflects a second returning beam back along the second optical path to the roof reflector, and wherein the roof reflector reflects and inverts the second returning beam along the second optical path back to the beamsplitter, and wherein the second returning beam is reflected by the beamsplitter and traverses the recombined optical beam path,
   a detector to receive the first and second returning beams from the recombined beam optical path.

2. The spectrometer of claim 1 further comprising a third reflector, interposed in the recombined beam optical path to the detector, for reflecting the first and second returning beams to the detector.

3. The spectrometer of claim 1 further comprising a carriage to hold the first and second reflectors.

4. The spectrometer of claim 3 wherein at least one of the reflectors and the carriage are formed of materials having substantially similar coefficients of expansion.

5. The spectrometer of claim 3 wherein at least one of the reflectors and the carriage are formed of materials having substantially similar coefficients of expansion, and wherein at least one of the reflectors is fixed to the carriage with a material having a coefficient of expansion substantially similar to the coefficients of expansion of the reflectors and carriage.

6. The spectrometer of claim 1 further comprising a retroreflector interposed between along the first optical path between the beamsplitter and the first reflector.

7. The spectrometer of claim 6 further comprising rotating disk mirror interposed along the first optical path between the beamsplitter and the retroreflector.

8. The spectrometer of claim 1 further comprising a retroreflector interposed in the second optical path between the beamsplitter and the second reflector.

9. The spectrometer of claim 8 further comprising at least one rotating disk mirror interposed along the second optical path between the beamsplitter and the retroreflector.

10. The spectrometer of claim 1 claim further comprising a first retroreflector interposed along the first optical path between the beamsplitter and the first mirror, and a second retroreflector interposed along the second optical path between the beamsplitter and the second reflector.

11. The spectrometer of claim 10 wherein the first and second reflectors form a two-sided reflector.

12. The spectrometer of claim 1 further comprising a first retroreflector interposed in the first optical path between the beamsplitter and the first reflector, a disk reflector interposed along the second optical path between the beamsplitter and the retroreflector, and a second retroreflector interposed along the second optical path between the beamsplitter and the second reflector.

13. The spectrometer of claim 12 wherein the first and second reflectors form a two-sided reflector.

14. A spectrometer, comprising:

a source of a primary beam of radiant energy, a beamsplitter for dividing the primary beam into at least a first beam and a second beam, wherein the first beam traverses a first optical path, and the second beam traverses a second optical path, a first reflector having a first reflector surface having a first orientation, a first retroreflector, interposed along the first optical path between the beamsplitter and the first reflector, wherein the first reflector surface is positioned to receive the first beam along the first optical path and to reflect a first returning beam along the first optical path back through the first retroreflector and through the beamsplitter where the first returning beam traverses a recombined beam optical path, a second reflector having a second reflector surface and a second orientation apposite the first orientation of the first reflector surface, a second retroreflector, interposed along the second optical path between the beamsplitter and the second reflector, wherein the second reflector surface is positioned to receive the second beam along the second optical path and to reflect a second returning beam along the second optical path back through the second retroreflector and reflect from the beamsplitter where the second returning beam traverses a recombined beam optical path, a roof reflector interposed along the second optical path between the beamsplitter and the second retroreflector, wherein the second beam following the second optical path is reflected and inverted by the roof reflector and directed along the second optical path to the second retroreflector, and wherein the second returning beam from the second retroreflector is reflected by the beamsplitter and traverses the recombined optical beam path, a detector to receive the first and second returning beams from the recombined beam optical path.

15. The spectrometer of claim 14 wherein the first and second reflector surfaces of the first and second reflectors form a two-sided reflector.

16. The spectrometer of claim 14 further comprising a first rotating disk reflector interposed along the first optical path between the beamsplitter and the first retroreflector.

17. The spectrometer of claim 14 further comprising a second rotating disk reflector interposed along the second optical path between the beamsplitter and the second retroreflector.

18. A spectrometer, comprising:

a source of a primary beam of radiant energy, a beamsplitter for dividing the primary beam into at least a first beam and a second beam, wherein the first beam traverses a first optical path, and the second beam traverses a second optical path, a terminal reflector having first and second reflector surfaces, a first retroreflector, interposed along the first optical path between the beamsplitter and the first reflector surface, a first disk reflector interposed along the first optical path between the beamsplitter and the first retroreflector, wherein the first reflector surface as positioned to receive the first beam along the first optical path and to reflect a first returning beam along the first optical path back through the first disk reflector and first retroreflector and through the beamsplitter, a second retroreflector, interposed along the second optical path between the beamsplitter and the second reflector surface, a second disk reflector interposed along the second optical path between the beamsplitter and the second retroreflector, wherein the second reflector surface is positioned to receive the second beam along the second optical path and to reflect a second returning beam along the second optical path back through the second disk reflector and second retroreflector and through the beamsplitter, a roof reflector interposed along the second optical path between the beamsplitter and the second retroreflector, wherein the second beam following the second optical path is reflected and inverted by the roof reflector and directed along the second optical path to the second retroreflector, and wherein the second returning beam from the second retroreflector is reflected by the beamsplitter, a recombined beam formed by the first returning beam traversing through the beamsplitter and by the second returning beam reflected by the beamsplitter, a detector to receive the recombined beam.

* * * * *